United States Patent
Graae et al.

(10) Patent No.: US 12,436,353 B2
(45) Date of Patent: Oct. 7, 2025

(54) CAMERA LENS FLEXURE COLLAR

(71) Applicant: Sphere Entertainment Group, LLC, New York, NY (US)

(72) Inventors: Michael Graae, Brooklyn, NY (US); Deanan Dasilva, Malibu, CA (US); Bryan Guenther, Tucson, AZ (US); John Mongelli, Tucson, AZ (US)

(73) Assignee: Sphere Entertainment Group, LLC, New York, NY (US)

( * ) Notice: Subject to any disclaimer, the term of this patent is extended or adjusted under 35 U.S.C. 154(b) by 508 days.

(21) Appl. No.: 17/887,250

(22) Filed: Aug. 12, 2022

(65) Prior Publication Data
US 2024/0053655 A1    Feb. 15, 2024

(51) Int. Cl.
*G02B 7/00* (2021.01)
*G02B 7/02* (2021.01)
(Continued)

(52) U.S. Cl.
CPC .............. *G02B 7/00* (2013.01); *G02B 7/023* (2013.01); *G02B 7/04* (2013.01); *G03B 3/00* (2013.01);
(Continued)

(58) Field of Classification Search
CPC ........ G03B 13/32; G03B 13/34; G03B 17/00; G03B 17/12; G03B 3/00;
(Continued)

(56) References Cited

U.S. PATENT DOCUMENTS 2,788,709 A * 4/1957 Huebner ................ G02B 17/02
359/740
5,751,500 A    5/1998 Bedzyk
(Continued)

FOREIGN PATENT DOCUMENTS

CN    110873994 A    3/2020
CN    116261023 A    6/2023
(Continued)

OTHER PUBLICATIONS

Rockwell Ken: "Nikon 300mm f/4 AF Review", Jun. 1, 2018; 7 pages.
(Continued)

*Primary Examiner* — Ricky L Mack
*Assistant Examiner* — Natasha Nigam
(74) *Attorney, Agent, or Firm* — Sterne, Kessler, Goldstein &Fox P.L.L.C.

(57) ABSTRACT

Disclosed herein are apparatus and system aspects for a camera lens flexure collar. An aspect includes an interior wall with one or more inner protrusions, an exterior wall with one or more openings, a cam located between the interior wall and the exterior wall, an actuator arm coupled to the cam and extending through the one or more openings of the exterior wall, and two flexures. The aspect operates through manipulation of the actuator arm, where manipulation of the actuator arm moves the cam and causes a force through the one or more inner protrusions of the interior wall, causing the interior wall to move in the axial direction within the stress limitations of the two flexures. In this aspect, movement of the interior wall in the axial direction can focus one or more camera lenses.

20 Claims, 7 Drawing Sheets

(51) Int. Cl.
*G02B 7/04* (2021.01)
*G03B 3/00* (2021.01)
*G03B 13/32* (2021.01)
*G03B 13/34* (2021.01)
*G03B 17/00* (2021.01)
*G03B 17/12* (2021.01)

(52) U.S. Cl.
CPC .............. *G03B 13/32* (2013.01); *G03B 13/34* (2013.01); *G03B 17/00* (2013.01); *G03B 17/12* (2013.01); *G03B 2205/0046* (2013.01); *G03B 2217/002* (2013.01)

(58) Field of Classification Search
CPC ...... G03B 2205/0046; G03B 2217/002; G02B 7/00; G02B 7/04; G02B 7/023
USPC ........ 359/425, 699, 704, 819, 823, 825, 826, 359/830
See application file for complete search history.

(56) References Cited

U.S. PATENT DOCUMENTS

| | | | |
|---|---|---|---|
| 7,405,760 B2 | 7/2008 | Cho et al. | |
| 7,729,065 B2 * | 6/2010 | Schoeppach | G03F 7/70825 |
| | | | 348/340 |
| 10,901,306 B2 | 1/2021 | Yamazaki | |
| 12,058,430 B2 | 8/2024 | DaSilva et al. | |
| 12,219,231 B2 | 2/2025 | Graae et al. | |
| 2011/0189808 A1 | 8/2011 | Watanabe | |
| 2012/0113276 A1 | 5/2012 | Van Arendonk et al. | |
| 2012/0200768 A1 * | 8/2012 | Ito | G03B 3/10 |
| | | | 359/813 |
| 2012/0327274 A1 * | 12/2012 | Taguchi | G02B 13/0015 |
| | | | 348/333.01 |
| 2013/0222685 A1 | 8/2013 | Topliss et al. | |
| 2015/0077544 A1 * | 3/2015 | Luscher | H04N 23/69 |
| | | | 348/135 |
| 2017/0104022 A1 | 4/2017 | Okamura et al. | |
| 2017/0123298 A1 | 5/2017 | Hine et al. | |
| 2017/0146766 A1 | 5/2017 | Hsu et al. | |
| 2017/0214830 A1 | 7/2017 | Tang et al. | |
| 2017/0353637 A1 | 12/2017 | Campbell et al. | |
| 2018/0084647 A1 | 3/2018 | Nalla et al. | |
| 2018/0114804 A1 | 4/2018 | Hsieh | |
| 2019/0174087 A1 | 6/2019 | Kim et al. | |
| 2019/0364192 A1 | 11/2019 | Wang et al. | |
| 2020/0026156 A1 * | 1/2020 | Kawai | G03B 17/14 |
| 2020/0200240 A1 | 6/2020 | Kondo | |
| 2020/0209517 A1 * | 7/2020 | Brobst | G02B 7/09 |
| 2021/0074750 A1 | 3/2021 | Gu et al. | |
| 2022/0006929 A1 | 1/2022 | Li et al. | |
| 2022/0121000 A1 * | 4/2022 | Iwasaki | G02B 7/09 |
| 2024/0064394 A1 | 2/2024 | Shin et al. | |
| 2024/0107141 A1 | 3/2024 | Jo et al. | |

FOREIGN PATENT DOCUMENTS

| | | |
|---|---|---|
| DE | 102019216808 A1 | 5/2021 |
| EP | 3693790 B1 | 10/2022 |
| JP | 2000180689 A | 6/2000 |
| JP | 5573164 B2 | 8/2014 |
| WO | WO 2022/145954 A1 | 7/2022 |

OTHER PUBLICATIONS

International Search Report and Written Opinion directed to related International Application No. PCT/US2023/074935, mailed Apr. 25, 2024; 9 pages.

International Search Report and Written Opinion directed to related International Application No. PCT/US2023/074912, mailed Apr. 24, 2024; 11 pages.

* cited by examiner

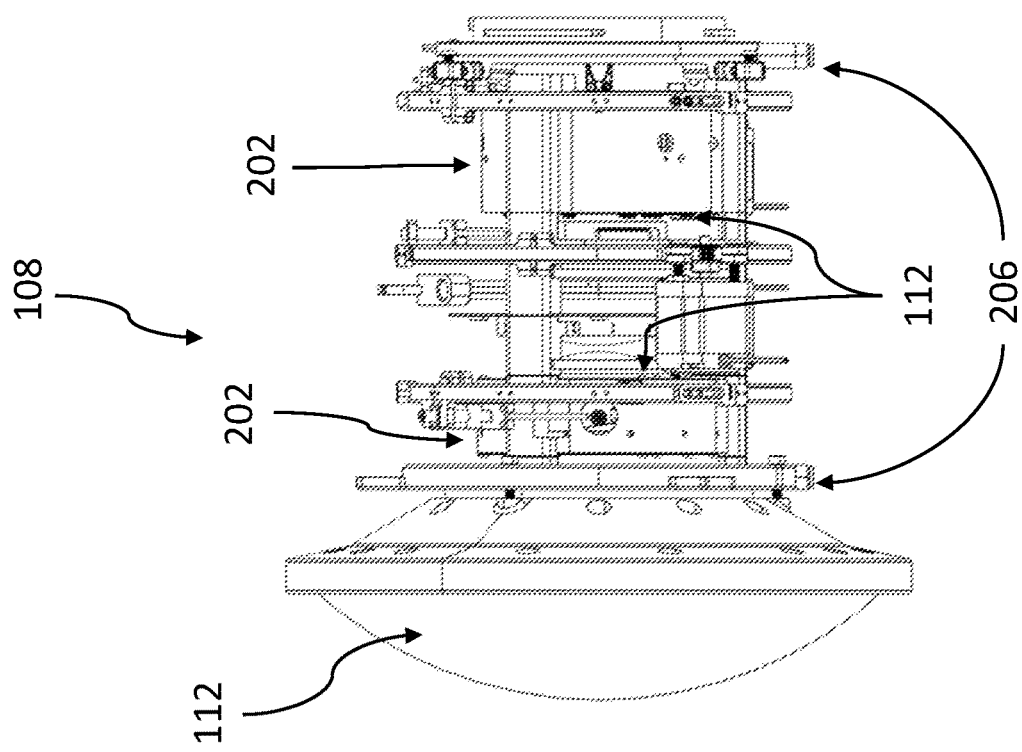
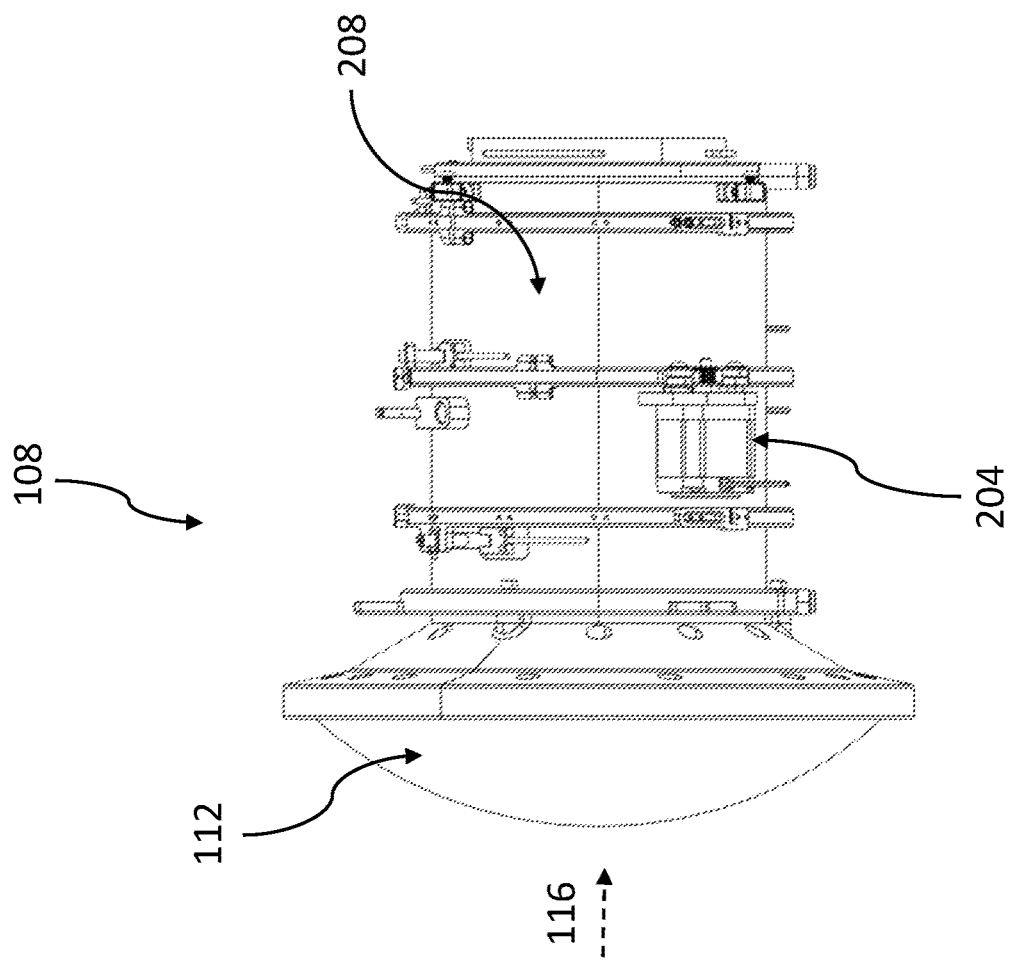
FIG. 2B
FIG. 2A

CAMERA LENS FLEXURE COLLAR

BACKGROUND

Technical Field

Aspects of the present disclosure relate to components and systems for camera lens collars capable of providing accurate focusing of a camera lens in one direction.

Background

A camera is a device used to capture and record real-life images in the form of photographs and/or videos. In order to capture and record such images, cameras may consist of a camera body and a camera lens. A camera lens may focus light reflected from objects in the real world onto an image sensor in the camera body. An image sensor is an electronic device that converts the focused light into an electronic signal representing a digital image. The image may then be used to generate a photograph or a frame in a high quality video stream. The camera body may also include controls, circuitry, and processors to execute computer-readable instructions that control various operations of the camera and a memory storage to save the digital images. Some cameras may receive power from an external power source (e.g., via a wire connection to a power outlet) while other cameras may receive power from an internal power source (e.g., a built-in or attachable battery pack).

A camera lens may be a single lens element or an assembly of lenses, where an assembly of lenses may contain one or more lens groups. A camera lens generally consists of convex and/or concave optical components used to bend incoming light in specific ways, such as towards a single focal point. In an assembly of lenses, the cumulative effect of various lens elements or lens groups allow the light to bend in specific ways. The type of camera lens used may determine camera characteristics like aperture range, depth of field, or focusing distance. Other camera components may include a filter or a focusing mechanism.

A focusing mechanism of a camera lens moves components within the camera lens, or the position of the camera lens itself, in order to focus on an object. One type of focusing mechanism uses a cam and follower. A cam and follower is used to convert rotational motion into linear motion. For example, a cam and follower focusing mechanism may take the form of a collar fastened around a cylindrical camera lens. As the cam moves rotationally around the circumference of the cylindrical camera lens, the follower may be configured to move the camera lens in the axial direction. Current focusing mechanisms using a cam and follower do not provide highly accurate movement and fail to restrict undesired movement of the camera lens in other directions (e.g., rotational, etc.). This is especially detrimental in larger cameras that require precise focusing movements.

SUMMARY

In aspects presented herein, cameras, camera lenses, and flexure collars can provide a highly accurate means of focusing a camera in a manner that restricts movement to the axial direction.

In an aspect, an example apparatus for a camera lens flexure collar is described. The example apparatus include an interior wall with one or more inner protrusions, an exterior wall with one or more openings, a cam located between the interior wall and the exterior wall, an actuator arm coupled to the cam and extending through the one or more openings of the exterior wall, and two flexures. The example apparatus operates through manipulation of the actuator arm, where manipulation of the actuator arm moves the cam and causes a force through the one or more inner protrusions of the interior wall, causing the interior wall to move in the axial direction within the stress limitations of the two flexures.

In another aspect, an example system for a series of camera lens flexure collars is described. The example system includes one or more camera lenses, a first flexure collar, a second flexure collar, and a support structure coupled to the first and second flexure collars. The first and second flexure collars in this example system both have at least one or more stacking mechanisms, an actuator arm, and an interior wall. The first and second flexure collars in this example system are coupled to one another by the one or more stacking mechanisms, and the first and second flexure collars are coupled to the one or more camera lenses by the interior walls. The example system operates through manipulation of the actuator arms, where manipulation of the actuator arms can focus the one or more camera lenses.

In yet another aspect, an example apparatus for a camera lens flexure collar is described. The example apparatus includes an interior wall, an exterior wall, two flexures, and a means for moving the interior wall in an axial direction within the stress limitations of the two flexures.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

FIGS. 2A-2B are illustrations of a camera lens without a lens housing and/or lens body, according to some aspects of the present disclosure.

In the drawings, like reference numbers generally indicate identical or similar elements. Additionally, generally, the left-most digit(s) of a reference number identifies the drawing in which the reference number first appears.

Figure 1:
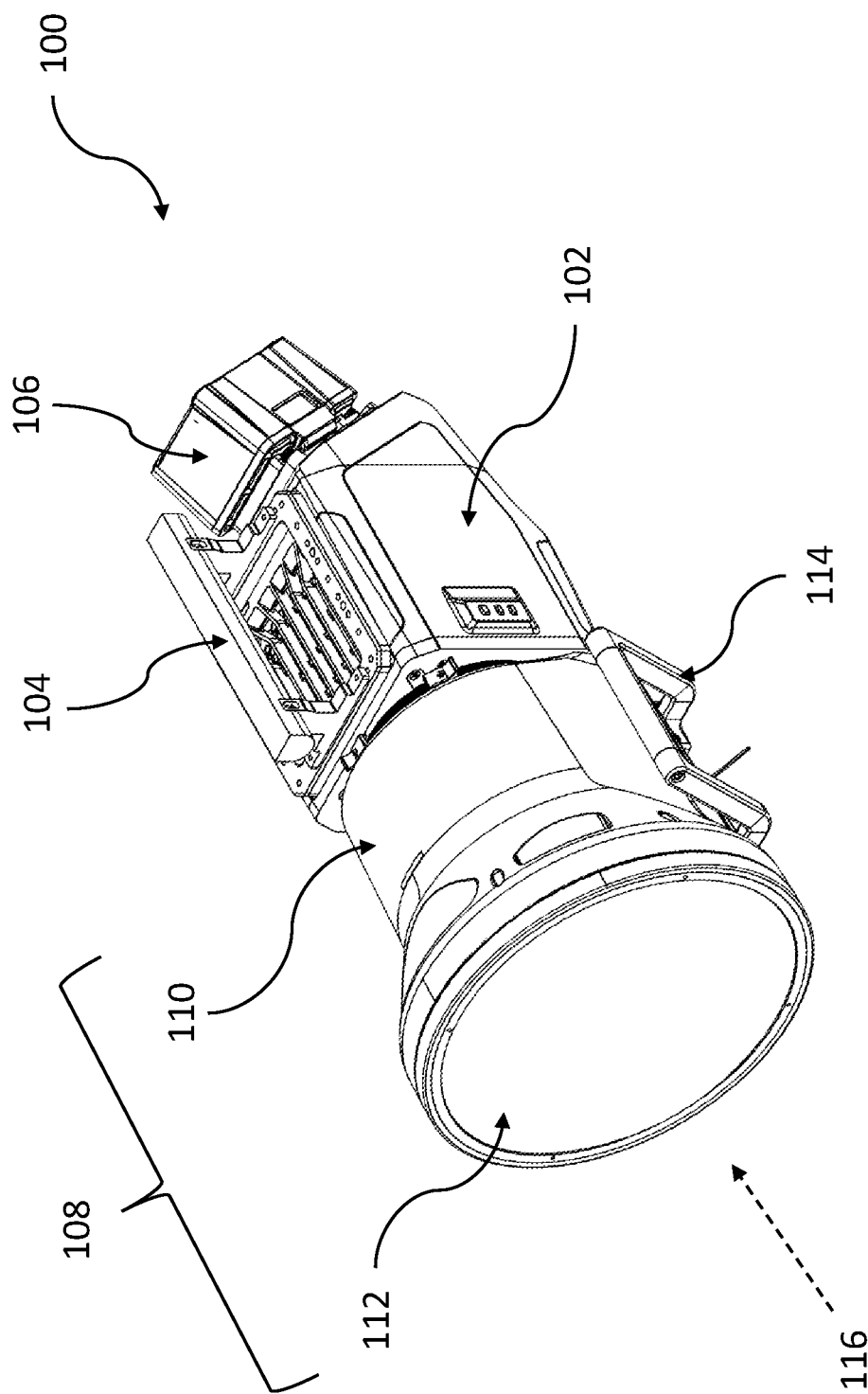
FIG. 1 is an illustration of an example camera system, according to some aspects of the present disclosure.

Aspects of the present disclosure will be described with reference to the accompanying drawings.

DETAILED DESCRIPTION

Provided herein are apparatus, device, and/or system aspects, and/or combinations and sub-combinations thereof for a camera lens flexure collar that can provide a highly accurate means of focusing a camera lens in a manner that restricts movement to the axial direction.

A focusing mechanism of a camera lens needs to move precisely, and in limited directions, in order to properly focus the camera lens on an object. Some focusing mechanisms use a cam and follower, where rotational motion of the cam is converted into linear motion of the follower. In the context of a camera lens, a cam may be coupled around a portion of the camera lens. When the cam moves (e.g., rotates) around the camera lens, the cam may then cause the follower to move the camera lens in a linear direction, such as axially. This is achieved through contact between the cam and the follower. While this type of focusing mechanism can achieve proper focus of the camera lens, movement of the cam and follower is not highly accurate and undesired movement (e.g., rotational, etc.) of the focusing mechanism or camera lens may occur—both resulting in loss of focus through errors in position. Larger cameras are often unable to use current cam and follower focusing mechanisms because larger cameras require lower tolerance movements, and the increased weight of components make achieving tighter tolerances more difficult.

There are two technological problems associated with implementing certain focusing mechanisms, such as cam and follower focusing mechanisms, with camera lenses. First, because there is no precision mechanism resisting the scope of axial movement of the camera lens, it is difficult to achieve highly accurate focusing. Second, even where axial movement of the camera lens can be properly controlled in order to accurately focus the camera lens, undesired movements may occur that bring the camera lens out of focus. For example, components of the cam and follower focusing mechanism may allow for rotational movement of the entire focusing mechanism or the camera lens, or the focusing mechanism may move in an askew manner, where a side of the camera lens moves differently than another side. Additionally, components of the cam and follower focusing mechanism may translate, causing lens decentering, yaw or pitch discrepancies and a resulting loss of image quality or increased aberrations.

Aspects herein solve this technological problem using an innovative camera lens flexure collar that implements a flexure with a cam and follower focusing mechanism. A flexure is a material machined to be flexible in one or more directions, and to constrain movement in all other directions. For example, the flexure coupled to the collar will allow movement of the camera lens in the axial direction (e.g., machined to be flexible in one direction), but will prevent movement in all other directions (e.g., rotational, etc.).

Aspects herein provide various benefits. For example, the camera lens flexure collar uses a flexure machined to be flexible in the axial direction in order to provide for highly accurate movement in the axial direction. In other words, the flexure is machined with certain stress limitations (e.g., resistive force) in the axial direction, where a movement (e.g., rotational) of the cam now results in a smaller movement of the follower in the axial direction. In another example, the camera lens flexure collar is machined to be rigid in all other directions in order to provide stability to the focusing mechanism and camera lens. In other words, focusing can occur in the axial direction, but the flexure will prevent rotational, linear, or other movement of the focusing mechanism and camera lens, preventing errors in position that would cause loss of focus. Therefore, the innovative approach of a camera lens flexure collar that implements a flexure with a cam and follower focusing mechanism solves the above technological problem by providing a highly accurate means of focusing a camera lens in a manner that restricts movement to the axial direction. This solution will prove particularly useful in larger cameras with lower tolerance focusing requirements.

FIG. 1 is an illustration of an example camera system 100, according to some aspects of the present disclosure. Camera system 100 may include a camera body 102, a handle 104, a power source 106, a camera lens 108, and various other camera system components, such as a mounting plate 114. Camera lens 108 may include a camera lens housing 110, one or more camera lens groups 112, and various other camera lens components, such as one or more focusing mechanisms used to focus one or more camera lens groups 112.

Camera body 102 may include an image sensor used to convert light 116 into an electronic signal representing a digital image, after light 116 is reflected from objects in the real world through the one or more camera lens groups 112. Camera body 102 of camera system 100 may be large, having an image sensor with an active area larger than a medium format negative.

Camera body 102 may include a handle 104 that allows a user to support, carry, or otherwise physically manipulate camera system 100. In some aspects, power source 106 may be removably coupled to camera body 102 and configured to provide sufficient voltage to power operations of camera body 102. For example, power source 106 may be a removable battery pack providing a DC voltage to camera body 102. In another example, power source 106 may be a power outlet providing an AC voltage via a plug and wire connectable to camera body 102. In other aspects, power source 106 may be incorporated into camera body 102 and not removable by a user. For example, power source 106 may be a single use battery or a rechargeable battery positioned within camera body 102. Camera lens housing 110 may provide mechanical and/or protective support to components internal to camera lens 108, such as one or more camera lens groups 112. Camera lens groups 112 are further described with reference to FIGS. 2A-2B.

FIGS. 2A-2B are illustrations of camera lens 108 without camera lens housing 110 and/or a camera lens body 208, according to some aspects of the present disclosure. Similar to camera lens housing 110, camera lens body 208 may provide mechanical and/or protective support to components internal to camera lens 108, such as one or more camera lens groups 112. Camera lens 108 is a system of various components configured to direct light 116 towards an image sensor in camera body 102. For example, camera lens 108 may include one or more focusing mechanisms, such as a flexure collar 202 (described below with reference to FIGS. 3-6), used to focus one or more lens groups 112. Camera lens 108 may also include a motorized device 204 and a support structure 206.

Camera lens groups 112 may each contain one or more lens elements, such as convex and/or concave optical components used to bend light 116 in specific ways. Each of the camera lens groups 112 may be surrounded by a covering. One or more focusing mechanisms, such as flexure collar 202, may attach to camera lens groups 112 (via the covering)

in order to focus light 116 towards an image sensor in camera body 102. The one or more focusing mechanisms, such as flexure collar 202, may move each of the camera lens groups 112 forward or backward independently from other camera lens groups 112 in order to focus or zoom, or the camera lens groups 112 may move together. For example, a first flexure collar 202 may be coupled to a first camera lens group 112 (via a covering). In this example, a second flexure collar 202 may be coupled to a same or different (e.g., a second) camera lens group 112 (via a covering).

Focusing of camera lens groups 112 can be achieved through manual manipulation of the one or more focusing mechanisms, such as flexure collar 202, or through automated manipulation by motorized device 204. For example, motorized device 204 may be directly coupled to a first flexure collar 202 or a second flexure collar 202, or may be coupled to support structure 206. Motorized device 204 may include a motor, a coupling to power source 106, and a computing device. The motor may be an electric motor configured to convert electrical energy from power source 106 into motion of the one or more focusing mechanisms. Power source 106 may be coupled to the motor by a wired connection. The computing device may be coupled to a linear encoder of the one or more focusing mechanisms. The computing device may also be coupled to power source 106. The computing device may be the same or similar as computing device 700 described in FIG. 7. The computing device may include a processor and a memory, where the memory contains instructions stored thereon that can be executed by the processor. The instructions, when executed, might cause the computing device to receive position information from a linear encoder. Based on this position information, the instructions may then cause the computing device to provide an amount of power to the motor through power source 106, resulting in manipulation the one or more focusing mechanisms, such as a first flexure collar 202 or a second flexure collar 202. Manipulation of the one or more focusing mechanisms through motorized device 708 may occur together or separately from one another.

Support structure 206 may be one or more surrounding bands configured to provide structural support to the one or more focusing mechanisms, such as flexure collar 202, and other components within camera lens 108. Support structure 206 may be the same geometric shape as the one or more focusing mechanisms. Support structure 206 may be coupled to the one or more focusing mechanisms, such as a first flexure collar 202 and a second flexure collar 202. Support structure 206 may be coupled to the one or more focusing mechanisms by one or more threaded screws and threaded holes, an adhesive, or any other fastening mechanism as would be appreciated by a person of ordinary skill in the art. Support structure 206 may be made of a metal, a metal alloy, a plastic, or any other material as would be appreciated by a person of ordinary skill in the art.

Support structure 206 may be coupled to mounting plate 114, as illustrated in FIG. 1. Support structure 206 may be coupled to mounting plate 114 by one or more threaded screws and threaded holes, an adhesive, or any other fastening mechanism as would be appreciated by a person of ordinary skill in the art. Mounting plate 114 may be configured to provide further stability to camera lens 108, such as by changing the center of gravity of camera lens 108 or by allowing for user manipulation of camera lens 108. Mounting plate 114 may also be configured to attach to a stationary device, such as a tripod.

Figures 3A, 3B, 3C:
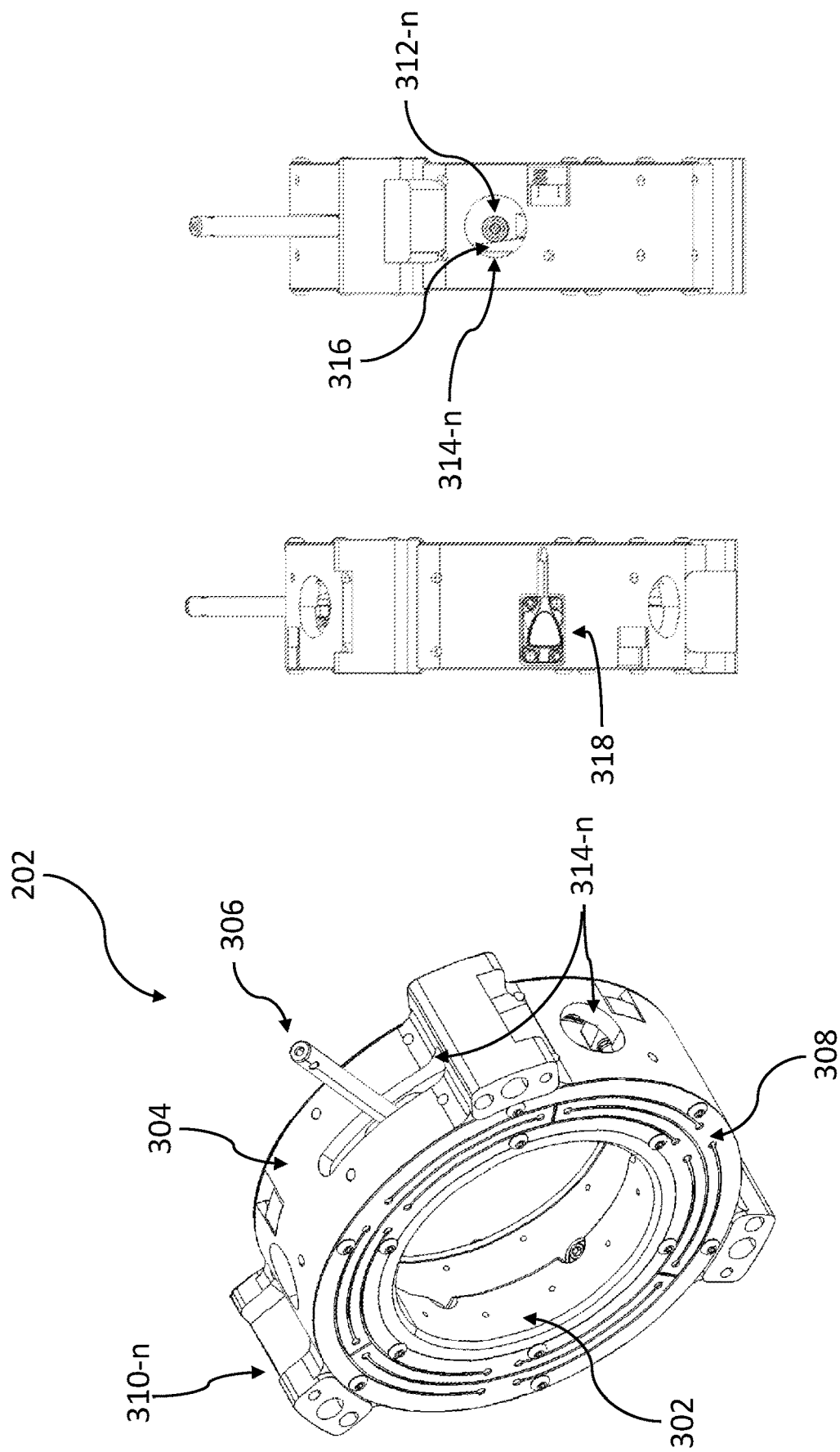
FIGS. 3A-3C are illustrations of a flexure collar, according to some aspects of the present disclosure.

FIGS. 3A-3C are illustrations of flexure collar 202, according to some aspects of the present disclosure. Flexure collar 202 may be the one or more focusing mechanisms of the camera lens 108 system illustrated in FIGS. 2A-2B. FIG. 3A is an isometric view of flexure collar 202. FIG. 3B is a left side view of flexure collar 202. FIG. 3C is a right side view of flexure collar 202. Flexure collar 202 may include an interior wall 302, an exterior wall 304, an actuator arm 306, at least one flexure 308, one or more stacking mechanisms 310-$n$, one or more inner protrusions 312-$n$, one or more openings 314-$n$, a cam 316, and a linear encoder 318. The individual components of flexure collar 202 are described with reference to FIGS. 4-6.

Figure 4C:
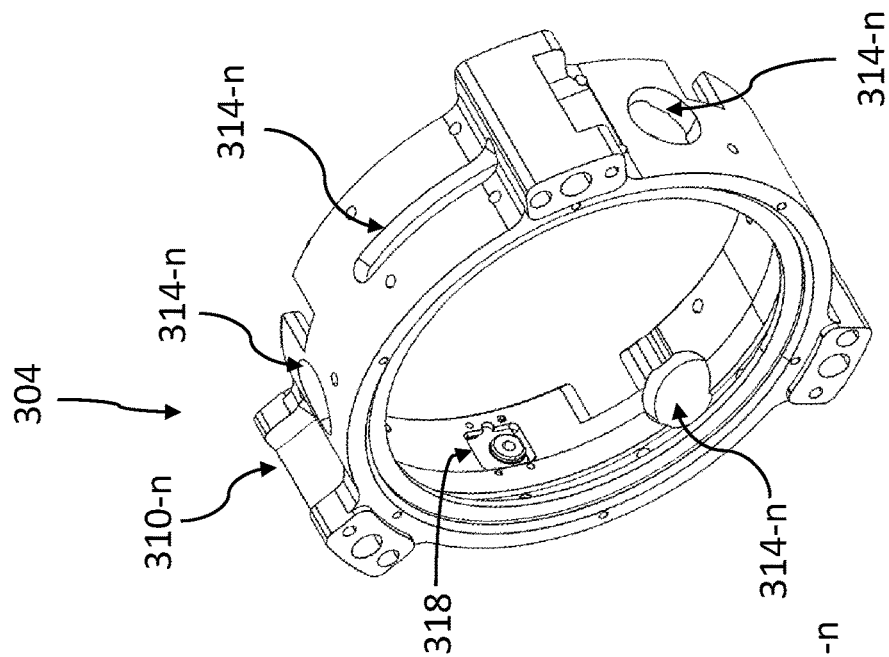
FIGS. 4A-4C are illustrations of sub-components of a flexure collar, including an interior wall, a cam, and an exterior wall, according to some aspects of the present disclosure.
Figure 4B:
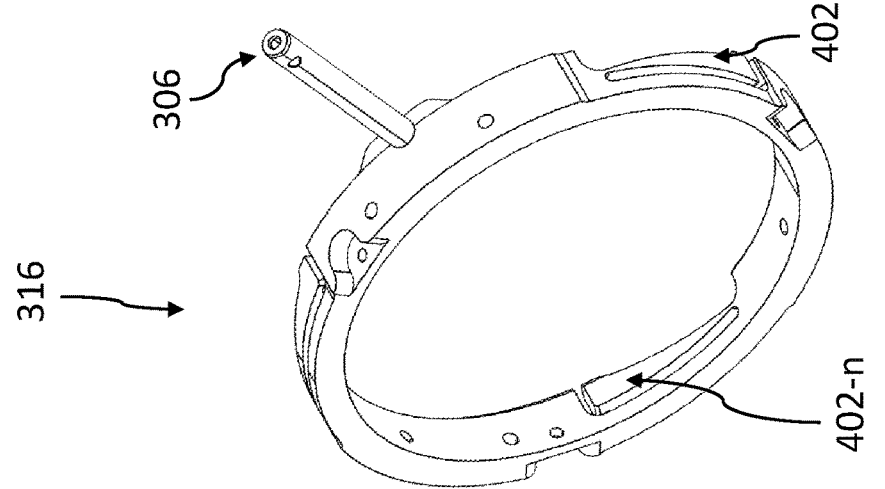
Figure 4A:
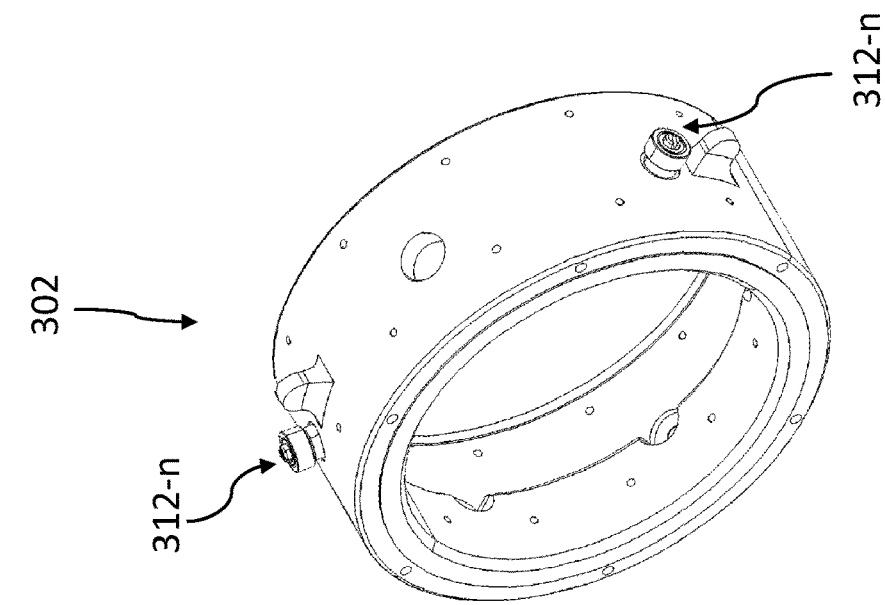

FIGS. 4A-4C are illustrations of sub-components of flexure collar 202, including interior wall 302, cam 316, and exterior wall 304, according to some aspects of the present disclosure. FIG. 4A is an illustration of interior wall 302. FIG. 4B is an illustration of cam 316. FIG. 4C is an illustration of exterior wall 304.

Referring to FIG. 4A, interior wall 302 is configured to be coupled to an exterior surface (e.g., covering) of one or more camera lens groups 112 by its inner surface. Interior wall 302 may be coupled to the exterior surface (e.g., covering) of one or more camera lens groups 112 by one or more threaded screws and threaded holes, an adhesive, or any other fastening mechanism as would be appreciated by a person of ordinary skill in the art. Because interior wall 302 is coupled to the exterior surface (e.g., covering) of one or more camera lens groups 112, movement of interior wall 302 moves the one or more camera lens groups 112. Interior wall 302 may be a cylinder, a rectangular prism, or any other geometric shape as would be appreciated by a person of ordinary skill in the art. The geometric shape of interior wall 302 is the same as the exterior surface (e.g., covering) of one or more camera lens groups 112, and of the same cross-sectional dimensions. For example, if the exterior surface (e.g., covering) of one or more camera lens groups 112 is a cylinder of diameter 75 mm, then interior wall 302 is a cylinder with inner diameter 75 mm. Interior wall 302 may have a length ranging between 35-45 mm. For example, interior wall 302 may be a cylinder with inner diameter 75 mm and height (e.g., length) 38 mm. Interior wall 302 may be made of a metal, a metal alloy, a plastic, or any other material as would be appreciated by a person of ordinary skill in the art. Interior wall 302 is coupled to one or more inner protrusions 312-$n$ (i.e., followers). Interior wall 302 may be coupled to inner protrusions 312-$n$ by one or more threaded screws and threaded holes, an adhesive, any other fastening mechanism as would be appreciated by a person of ordinary skill in the art, or may be machined as one component. Interior wall 302 has a main surface and two ends (e.g., edges, surfaces, etc.), a first end and a second end. The first end may be considered one of the ends closer to camera body 102 of FIG. 1, or the end closer to light 116 of FIGS. 1-2. The second end may be considered the end opposite the first end.

Inner protrusions 312-$n$ may be followers to cam 316 (described below with reference to FIG. 4B). Inner protrusions 312-$n$ may be shaped as a circle, oval, or any other curved geometric shape as would be appreciated by a person of ordinary skill in the art. Inner protrusions 312-$n$ are a curved geometric shape so that it may interact with the angled surfaces of wedge cams 402-$n$ (described below with reference to FIG. 4B). Inner protrusions 312-$n$ may be fixed to interior wall 302 and unable to move in any direction independent of interior wall 302. There may be the same amount of inner protrusions 312-$n$ as there are wedge cams 402-$n$, and the position of inner protrusions 312-$n$ around interior wall 302 may be in alignment with the position of wedge cams 402-*n* around cam 316. Inner protrusions 312-*n* may contact wedge cams 402-*n*, such that when cam 316 moves (e.g., is rotated by actuator arm 306 around a central point), the angled surface of wedge cams 402-*n* causes inner protrusions 312-*n* to rise and fall with the inclination of the angled surface. Because inner protrusions 312-*n* are coupled to interior wall 302, rising and falling of inner protrusions 312-*n* causes interior wall 302 to move in the same direction (e.g., axially) and at the same distance.

Referring to FIG. 4C, exterior wall 304 may be a cylinder, a rectangular prism, or any other geometric shape as would be appreciated by a person of ordinary skill in the art. Exterior wall 304 may be the same or different shape as interior wall 302, and thus the same or different shape as an exterior surface (e.g., covering) of one or more camera lens groups 112. Exterior wall 304 may have a length ranging between 35-45 mm. For example, exterior wall 304 may be a cylinder with inner diameter 98 mm and height (e.g., length) 38 mm. Exterior wall 304 may be made of a metal, a metal alloy, a plastic, or any other material as would be appreciated by a person of ordinary skill in the art. Exterior wall 304 has a main surface and two ends (e.g., edges, surfaces, etc.), a first end and a second end. The first end may be considered one of the end closer to camera body 102 of FIG. 1, or the end closer to light 116 of FIGS. 1-2. The second end may be considered the end opposite the first end. Exterior wall 304 may be exposed to an environment external to camera lens 108, or may be surrounded by camera lens housing 110 or camera lens body 208. Exterior wall 304 may include various other components, such as one or more openings 314-*n*, one or more stacking mechanisms 310-*n*, and linear encoder 318.

When flexure collar 202 is assembled, openings 314-*n* may allow external access to components internal to exterior wall 304, such as cam 316 (described below with reference to FIG. 4B). Openings 314-*n* may allow external components, such as actuator arm 306 (described below with reference to FIG. 4B), to contact internal components, such as cam 316. Openings 314-*n* may be circular, slotted, or any other geometric shape as would be appreciated by a person of ordinary skill in the art. For example, at least one opening 314-*n* may be circular in order to view contact between cam 316 and inner protrusions 312-*n* (e.g., followers) of FIG. 4A. In another example, at least one opening 314-*n* may be a slotted opening that allows actuator arm 306 to be coupled to cam 316. The slotted opening may be configured to allow actuator arm 306 to move around exterior wall 304, such that movement of actuator arm 306 within the slotted opening is perpendicular to eventual movement of interior wall 302. In other words, movement of actuator arm 306 around exterior wall 304 causes cam 316 to move in the same motion; wedge cams 402-*n* (described below with reference to FIG. 4B) of cam 316 then cause a force through inner protrusions 312-*n*, resulting in axial movement of interior wall 302.

Stacking mechanisms 310-*n* may be coupled to exterior wall 304 by one or more threaded screws and threaded holes, an adhesive, any other fastening mechanism as would be appreciated by a person of ordinary skill in the art, or may be machined as one component. Stacking mechanisms 310-*n* may be positioned equidistant around exterior wall 304. Stacking mechanisms 310-*n* may include one or more fastening mechanisms. Stacking mechanisms 310-*n* may be configured to allow more than one flexure collar 202 to be attached to one another via the one or more fastening mechanisms. For example, one flexure collar 202 may attach to a second flexure collar 202 by three stacking mechanisms 310-*n* consisting of threaded screws and threaded openings.

Stacking mechanisms 310-*n* may extend along the full length of exterior wall 304. Stacking mechanisms 310-*n* may be made of a metal, a metal alloy, a plastic, or any other material as would be appreciated by a person of ordinary skill in the art.

Linear encoder 318 may be coupled to exterior wall 304 by one or more threaded screws and threaded holes, an adhesive, or any other fastening mechanism as would be appreciated by a person of ordinary skill in the art. Linear encoder 318 may measure linear movement of components internal to exterior wall 304 (e.g., interior wall 302 of FIG. 4A). Specifically, linear encoder 318 may measure speed, distance, direction, position, or displacement. Linear encoder 318 may be coupled to exterior wall 304 in a position adjacent to or on one of openings 314-*n*, such that linear encoder 318 may measure the linear movement of inner protrusions 312-*n* or interior wall 302. Information of linear movement of components internal to exterior wall 304 is useful for determining how much actuator arm 306 (described below with reference to FIG. 4B), and thus interior wall 302, must be moved in order to properly position one or more camera lens groups 112 into focus. Linear encoder 318 may be considered a sensor or transducer. Linear encoder 318 may include components such as a mounting element, a reading head, a slider, a rail, a cover tape, a scale, and one or more reference points. Alternatively, linear encoder 318 may be a ring encoder. Linear encoder 318 may be coupled to a computing device, such as that described in FIG. 7. Linear encoder 318 may be coupled to computing device 700 through a wired channel, a wireless channel, or a combination thereof. Linear encoder 318 may detect linear movement and transmit it to computing device 700 in order for the information to undergo further processing or to be used in manipulating actuator arm 306. For example, position information from linear encoder 318 may be used by motorized device 204 (e.g., motor, power source 106, and a computing device) to cause the computing device to provide an amount of power to the motor through power source 106, resulting in an automated manipulation of actuator arm 306 of flexure collar 202.

Referring to FIG. 4B, when flexure collar 202 is assembled, between interior wall 302 and exterior wall 304 is cam 316. Cam 316 may be secured to interior wall 302 by one or more fastening mechanisms. For example, cam 316 may be secured to interior wall 302 by three pins which secure it in place and allow for rotational motion. Cam 316 may be a cylinder, a rectangular prism, or any other geometric shape as would be appreciated by a person of ordinary skill in the art. The geometric shape of cam 316 is the same as interior wall 302 of FIG. 4A. For example, if interior wall 302 is a cylinder, cam 316 is a cylinder. When flexure collar 202 is assembled, cam 316 may be moveable within the space between interior wall 302 and exterior wall 304. For example, if interior wall 302 and exterior wall 304 are cylinders, cam 316 is a cylinder that rotates in a space between interior wall 302 and exterior wall 304. Cam 316 may be made of a metal, a metal alloy, a plastic, or any other material as would be appreciated by a person of ordinary skill in the art. Cam 316 may be a wedge cam, a translating cam, or any other type of cam as would be appreciated by a person of ordinary skill in the art. A wedge cam has an angled cam surface that allows the follower (e.g., inner protrusions 312-*n*) to move in a specific straight motion at a rate that corresponds with the rate of incline of the angled surface. For example, FIG. 4B illustrates one or more wedge cams 402-*n*. Wedge cams 402-*n* are angled cam surfaces that contact inner protrusions 312-*n* of FIG. 4A, where inner protrusions 312-*n* act as followers to cam 316. There may be the same amount of inner protrusions 312-*n* as there are wedge cams 402-*n*, and the position of inner protrusions 312-*n* around interior wall 302 may be in alignment with the position of wedge cams 402-*n* around cam 316. As cam 316 moves around a central point, wedge cams 402-*n* cause a force through inner protrusions 312-*n*. The force causes inner protrusions 312-*n* to rise and fall with the inclination of the angled surface of wedge cams 402-*n*. Wedge cams 402-*n* may have one or more stopping mechanisms preventing movement of cam 316 past a certain point. The length of wedge cams 402-*n* and the position of one or more stopping mechanisms along the movement path of cam 316 may restrict the amount of movement possible for inner protrusions 312-*n*. Cam 316 may also be coupled to other components, such as actuator arm 306.

Actuator arm 306 may be used to move cam 316. When flexure collar 202 is assembled, actuator arm 306 may be positioned external to exterior wall 304, may extend through an opening 314-*n* (such as a slotted opening), and may be coupled to cam 316. Actuator arm 306 may be coupled to cam 316 by one or more threaded screws and threaded holes, an adhesive, or any other fastening mechanism as would be appreciated by a person of ordinary skill in the art. Actuator arm 306 may be a geometric shape with a large first dimension, and smaller subsequent dimensions, such that actuator arm 306 may be easily positioned through an opening 314-*n* while being easily manipulated from a position external to exterior wall 304. For example, actuator arm 306 may be a cylinder with a height dimension several times larger than a diameter dimensions. This shape of actuator arm 306 allows for higher torque, especially when actuator arm 306 is capable of rotational movement in an opening 314-*n*. Actuator arm 306 may be manipulated in a direction perpendicular to the eventual movement caused in interior wall 302.

Figure 5:
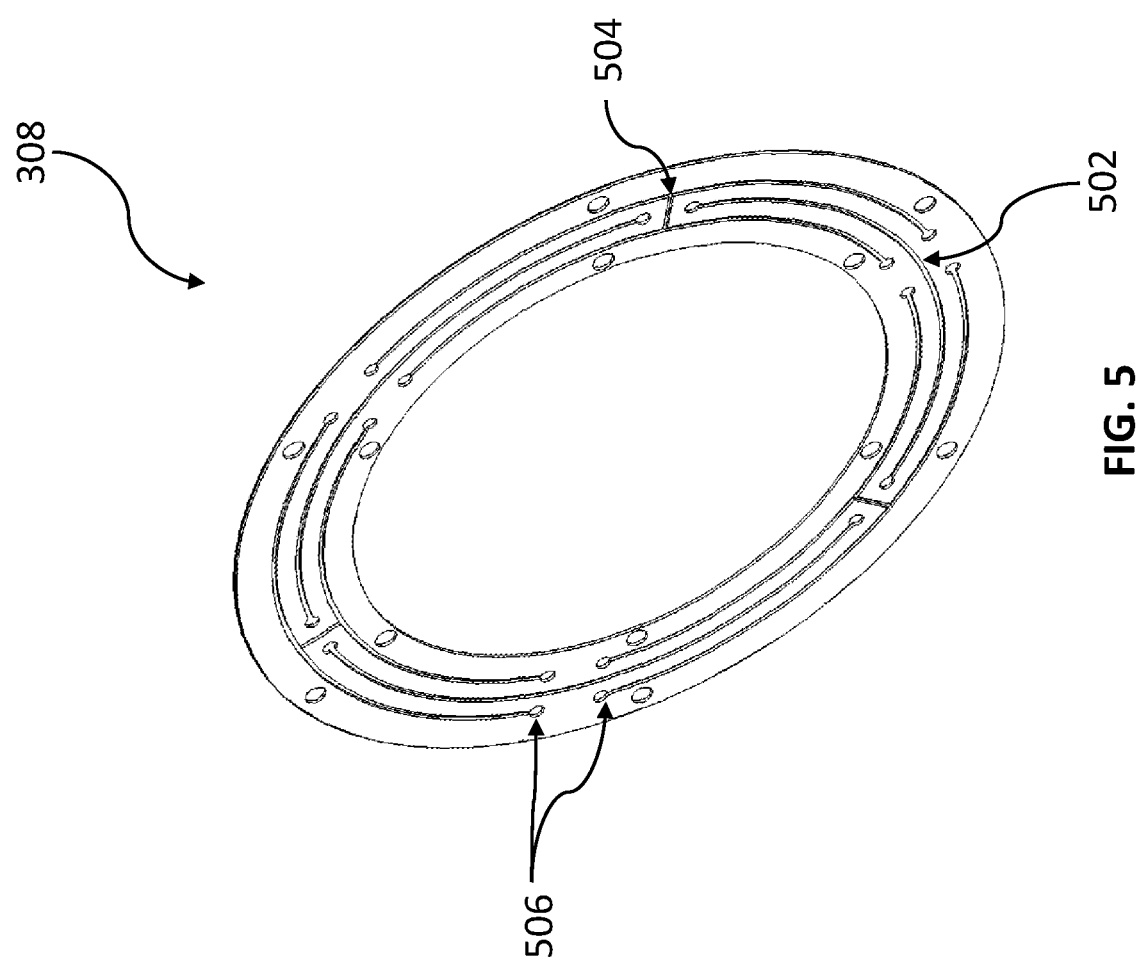
FIG. 5 is an illustration of a flexure, according to some aspects of the present disclosure.

FIG. 5 is an illustration of flexure 308, according to some aspects of the present disclosure Flexure 308 is a single component machined to be flexible in one direction and to restrict movement in other directions. Flexure 308 may include at least one slotted opening 502. Flexure 308 may include one slotted opening 502, or more than one slotted opening 502. Slotted opening 502 allows flexure 308 to move in only one direction. Slotted opening 502 may be configured in layers of switchbacks 504 following the perimeter of flexure 308. In this configuration, the inner most layer has the greatest amount of possible movement in the flexible direction compared to outer switchback layers. The number of total layers of switchbacks 504 and the width of the layers effects the total amount of possible movement of flexure 308 in the flexible direction. Slotted opening 502 may also include circular openings 506 along the layers of switchbacks 504. Circular openings 506 effect the amount of stress relief provided to flexure 308 as it moves in the flexible direction. Therefore, the shape and frequency of slotted opening 502 impacts how flexure 308 moves in the flexible direction.

Flexure 308 may be coupled to interior wall 302 and exterior wall 304 by one or more threaded screws and threaded holes, an adhesive, or any other fastening mechanism as would be appreciated by a person of ordinary skill in the art. A first flexure 308 may be coupled to a first end of interior wall 302 and a first end of exterior wall 304. A second flexure 308 may be coupled to a second end of interior wall 302 and a second end of exterior wall 304. Flexure 308 may be shaped so that an inner dimension conforms to the shape of interior wall 302 and an outer dimension conforms to the shape of exterior wall 304. Flexure 308 may be made of a metal, a metal alloy, a plastic, or any other material as would be appreciated by a person of ordinary skill in the art.

Implementation of flexure 308 with interior wall 302 and exterior wall 304 limits the amount of movement possible for interior wall 302. For example, if interior wall 302 is cylindrical and moves axially in response to rotational manipulation of actuator arm 306, interior wall 302 can now only move within the stress limitation of flexure 308. This resistive force allows for more accurate movement of interior wall 302, and thus more accurate focusing of one or more camera lens groups 112. Additionally, flexure 308 will prevent interior wall 302 from moving in any direction other than axially. This stability provided by flexure 308 prevents an error in position that would cause a loss of focus. Other mechanisms in flexure collar 202 may restrict movement of interior wall 302 and provides stability, such as the length of wedge cam 402-*n* of FIG. 4B, the presence of stopping mechanisms on wedge cam 402-*n*, and the presence of tension springs between cam 316 and flexure 308.

Figure 6:
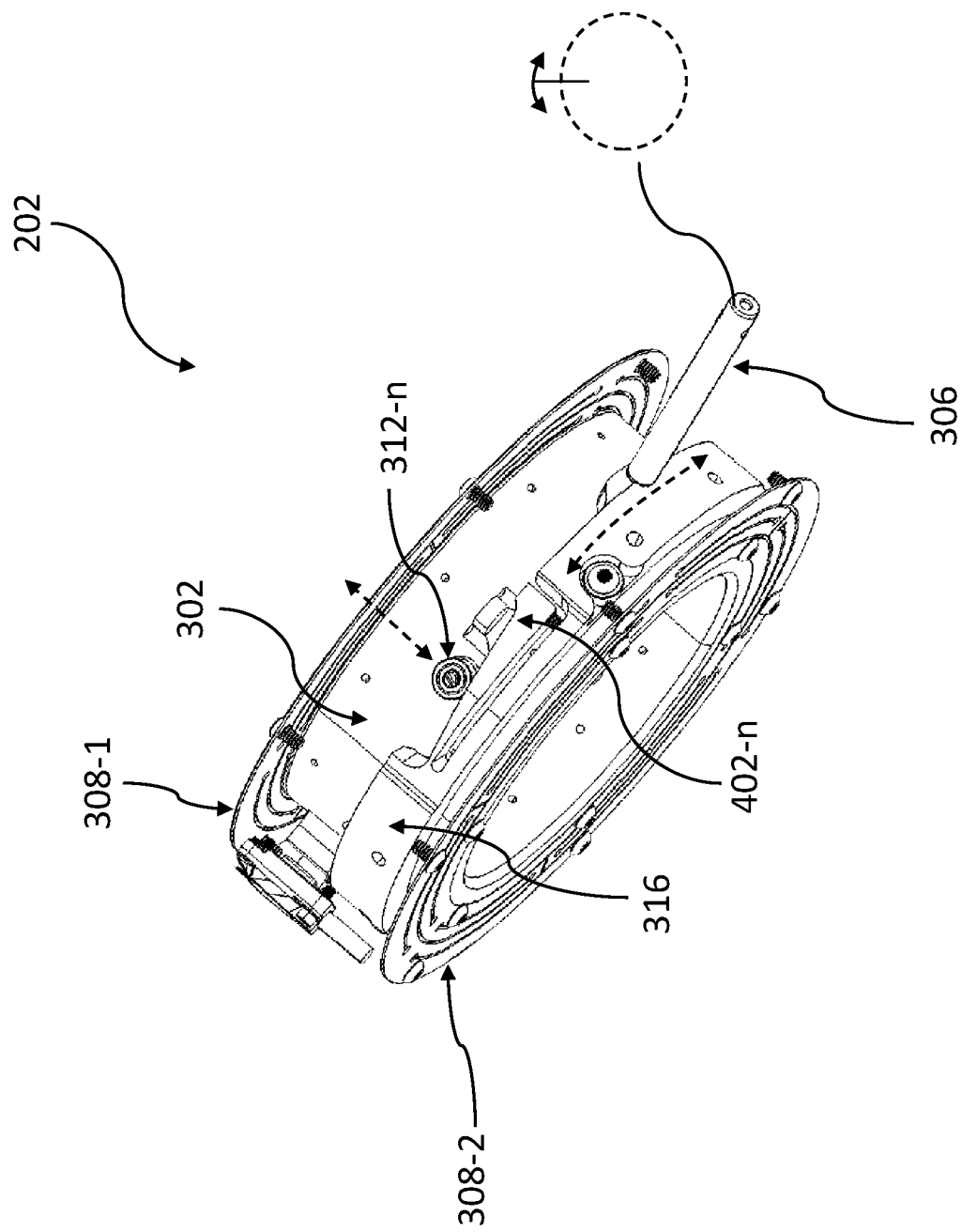
FIG. 6 is an illustration of a flexure collar without an exterior wall, according to some aspects of the present disclosure.

Effects of manipulation of actuator arm 306 may be understood with reference to FIG. 6. FIG. 6 is an illustration of flexure collar 202 without exterior wall 304, according to some aspects of the present disclosure. Actuator arm 306 may manipulate cam 316, causing cam 316 and wedge cams 402-*n* to interact with inner protrusions 312-*n*. In an example where the components are cylindrical, actuator arm 306 may rotate around exterior wall 304 (within opening 314-*n*) in order to rotate cam 316 between interior wall 302 and exterior wall 304. Rotational movement of cam 316, and thus wedge cams 402-*n*, causes linear movement in inner protrusions 312-*n* due to contact between wedge cams 402-*n* and inner protrusions 312-*n*. Because inner protrusions 312-*n* are coupled to interior wall 302, this interaction may result in axial movement of interior wall 302 within the stress limitations of flexure 308-1 and flexure 308-2, and thus axial movement of one or more camera lens group 112 coupled to interior wall 302. Therefore, manipulation of actuator arm 306 may be used to focus camera lens 108. As described previously, manipulation of actuator arm 306 may be accomplished manually, or by motorized device 204.

Figure 7:
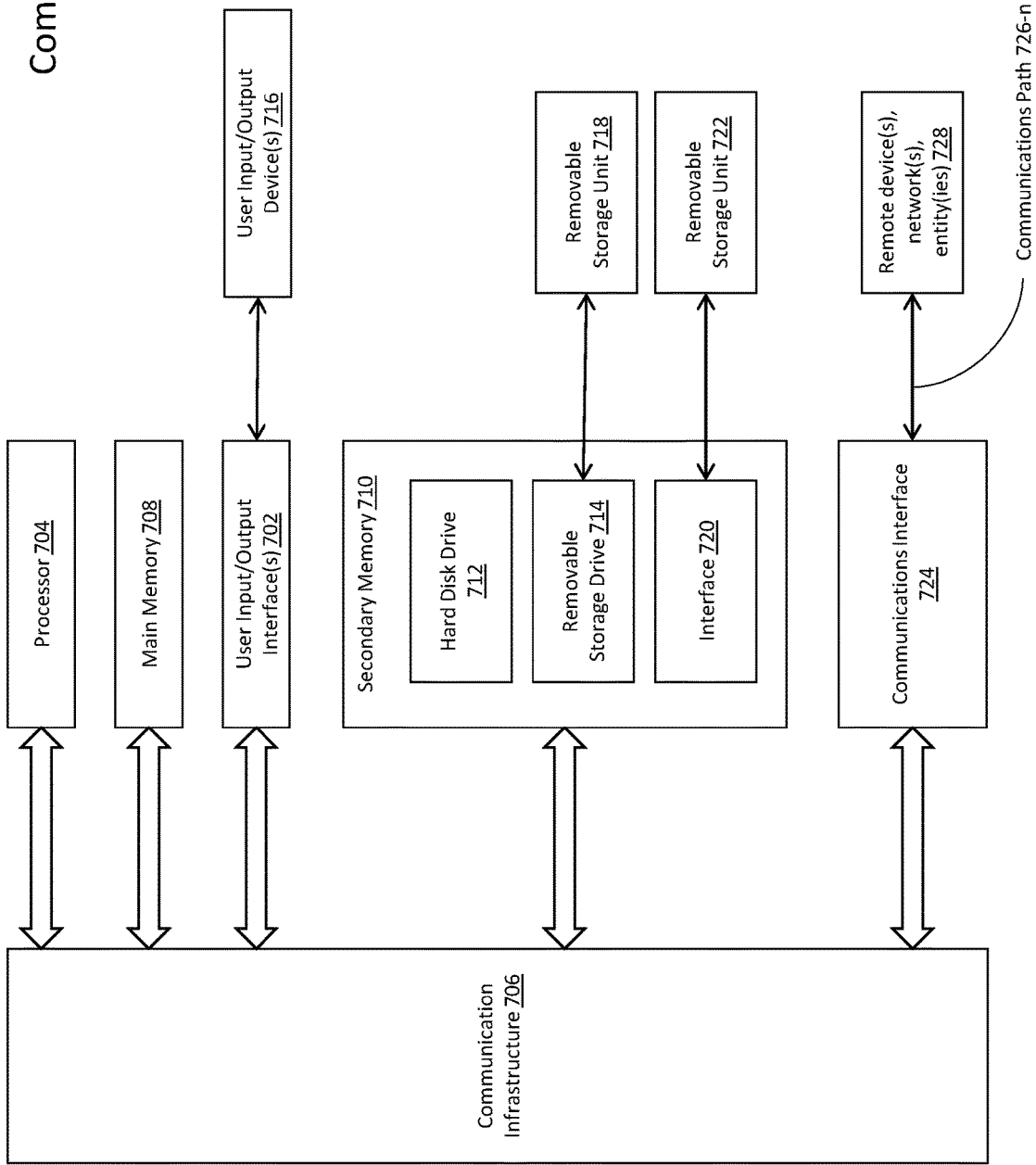
FIG. 7 is a block diagram of an example computer system useful for implementing various aspects.

Various aspects can be implemented, for example, using one or more computer systems, such as computer system 700 shown in FIG. 7. Computer system 700 can be used, for example, to implement a system of flexure collars manipulated by motorized device 204. For example, computer system 700 can receive position information on the flexure collars from a linear encoder and can provide an amount of power to a motor through a power device in order to manipulate the flexure collars to a desired position. Computer system 700 can be any computer capable of performing the functions described herein.

Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an aspect, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 716, such as monitors, keyboards, pointing devices, etc., that communicate with communication infrastructure 706 through user input/output interface(s) 802.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary aspect, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an aspect, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 7. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein. Any dimensions provided herein are exemplary and other dimensions are possible, as would be appreciated by a person of ordinary skill in the art.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. An apparatus, comprising:
   an interior wall with one or more inner protrusions, wherein the interior wall has a first end and a second end;
   an exterior wall with one or more openings, wherein the exterior wall has a first end and a second end;
   a cam configured to be rotated between the interior wall and the exterior wall to cause the one or more inner protrusions to displace the interior wall in an axial direction relative to the exterior wall, the axial direction being perpendicular to the rotation of the cam between the interior wall and the exterior wall;
an actuator arm, coupled to the cam and extending through the one or more openings of the exterior wall, configured to be rotated to cause the rotation of the cam between the interior wall and the exterior wall;
a first flexure, coupled to the first end of the interior wall and the first end of the exterior wall, configured to prevent the interior wall from rotating in response to the rotation of the cam between the interior wall and the exterior wall to stabilize the interior wall; and
a second flexure coupled to the second end of the interior wall and the second end of the exterior wall, configured to prevent the interior wall from rotating in response to the rotation of the cam between the interior wall and the exterior wall to stabilize the interior wall.

2. The apparatus of claim 1, further comprising:
one or more stacking mechanisms coupled to the exterior wall, the one or more stacking mechanisms configured to attach to another apparatus.

3. The apparatus of claim 1, further comprising:
a linear encoder coupled to the exterior wall and configured to detect position information of the interior wall through the one or more openings of the exterior wall.

4. The apparatus of claim 1, wherein the first flexure and the second flexure comprise at least one slotted opening.

5. The apparatus of claim 1, wherein the interior wall and the exterior wall are cylindrical.

6. The apparatus of claim 1, wherein the actuator arm extends through one of the one or more openings in the exterior wall that allows the actuator arm to be manipulated in a direction perpendicular to the axial direction.

7. A system, comprising:
one or more camera lens groups;
a first flexure collar having at least one or more first stacking mechanisms, a first actuator arm, a first interior wall, a first exterior wall, a first flexure, and a second flexure, wherein the first flexure collar is coupled to the one or more camera lens groups by the first interior wall, wherein the first actuator arm is configured to be rotated to displace the first interior wall in an axial direction relative to the first exterior wall, wherein the first flexure and the second flexure are configured to prevent the first interior wall from rotating in response to the rotation of the first actuator arm;
a second flexure collar having at least one or more second stacking mechanisms, a second actuator arm, a second interior wall, a second exterior wall, a third flexure, and a fourth flexure, wherein the second flexure collar is coupled to the first flexure collar by the second one or more stacking mechanisms and is coupled to the one or more camera lens groups by the second interior wall, wherein the second actuator arm is configured to be rotated to displace the second interior wall in the axial direction relative to the second exterior wall, wherein the third flexure and the fourth flexure are configured to prevent the second interior wall from rotating in response to the rotation of the second actuator arm; and
a support structure coupled to the first flexure collar and the second flexure collar,
whereby manipulation of the first actuator arm or the second actuator arm displaces the first interior wall and the second interior wall, respectively, to focus the one or more camera lens groups.

8. The system of claim 7, further comprising:
a mounting plate coupled to the support structure, the mounting plate configured to provide stability to the system.

9. The system of claim 7, wherein the first flexure collar is coupled to a first camera lens group and the second flexure collar is coupled to a second camera lens group.

10. The system of claim 7, wherein the first flexure collar further comprises a cam configured to be rotated between the first interior wall and the first exterior wall in response to the rotation of the first actuator arm to cause one or more inner protrusions of the first interior wall to displace the first interior wall in the axial direction relative to the first exterior wall.

11. The system of claim 10, wherein the first flexure and the second flexure comprise at least one slotted opening.

12. The system of claim 7, wherein the first actuator arm is manipulated by a motorized device, the motorized device comprising:
a linear encoder, configured to monitor the first interior wall through one or more openings of the first exterior wall;
a motor coupled to the first actuator arm;
a power device coupled to the motor; and
a computing device, coupled to the linear encoder and the power device, configured to:
receive position information from the linear encoder; and
provide an amount of power to the motor through the power device in order to manipulate the first actuator arm to a desired position.

13. The system of claim 7, wherein the first flexure collar or the second flexure collar are cylindrical.

14. The system of claim 7, wherein the first flexure collar or the second flexure collar are made of a metal or a metal alloy.

15. An apparatus, comprising:
an interior wall having a first end and a second end;
an exterior wall having a third end and a fourth end;
a cam configured to be rotated between the interior wall and the exterior wall to cause one or more inner protrusions of the interior wall to displace the interior wall in an axial direction relative to the exterior wall, the axial direction being perpendicular to the rotation of the cam between the interior wall and the exterior wall; and
a first flexure configured to prevent the interior wall from rotating in response to the rotation of the cam between the interior wall and the exterior wall to stabilize the interior wall.

16. The apparatus of claim 15, further comprising:
one or more stacking mechanisms coupled to the exterior wall, the one or more stacking mechanisms configured to attach to another apparatus.

17. The apparatus of claim 15, further comprising:
a linear encoder coupled to the exterior wall and configured to detect position information of the interior wall through one or more openings of the exterior wall.

18. The apparatus of claim 15, wherein the first flexure comprises at least one slotted opening.

19. The apparatus of claim 18, wherein a stress limitation of the first flexure is predetermined based on a number of the at least one slotted openings.

20. The apparatus of claim 15, wherein the interior wall and the exterior wall are cylindrical.

* * * * *

UNITED STATES PATENT AND TRADEMARK OFFICE
CERTIFICATE OF CORRECTION

| | | |
|---|---|---|
| PATENT NO. | : 12,436,353 B2 | Page 1 of 1 |
| APPLICATION NO. | : 17/887250 | |
| DATED | : October 7, 2025 | |
| INVENTOR(S) | : Graae et al. | |

It is certified that error appears in the above-identified patent and that said Letters Patent is hereby corrected as shown below:

On the Title Page

Item (74), in "Attorney, Agent, or Firm", Line 2, delete "&Fox" and insert -- & Fox --, therefor.

In the Claims

In Column 14, Claim 19, Line 63, delete "openings." and insert -- opening. --, therefor.

Signed and Sealed this
Eighteenth Day of November, 2025

John A. Squires
*Director of the United States Patent and Trademark Office*